United States Patent
McSherry (10) Patent No.: US 7,379,947 B2
(45) Date of Patent: May 27, 2008

(54) EFFICIENTLY RANKING WEB PAGES VIA MATRIX INDEX MANIPULATION AND IMPROVED CACHING

(75) Inventor: Frank David McSherry, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 10/903,345

(22) Filed: Jul. 30, 2004

(65) Prior Publication Data

US 2006/0026191 A1    Feb. 2, 2006

(51) Int. Cl.
*G06F 7/00* (2006.01)
(52) U.S. Cl. .................. 707/102; 707/5; 707/7
(58) Field of Classification Search .......... 707/5, 707/7, 200, 104.1
See application file for complete search history.

(56) References Cited

U.S. PATENT DOCUMENTS

| | | | |
|---|---|---|---|
| 5,488,723 A | 1/1996 | Baradel et al. | |
| 5,726,987 A | 3/1998 | Uriu et al. | |
| 6,055,418 A | 4/2000 | Harris et al. | |
| 6,122,628 A * | 9/2000 | Castelli et al. | 707/5 |
| 6,126,330 A | 10/2000 | Knight | |
| 6,198,390 B1 | 3/2001 | Schlager et al. | |
| 6,216,237 B1 | 4/2001 | Klemm et al. | |
| 6,285,999 B1 * | 9/2001 | Page | 707/5 |
| 6,295,643 B1 | 9/2001 | Brown et al. | |
| 6,324,619 B1 | 11/2001 | Raverdy et al. | |
| 6,466,980 B1 | 10/2002 | Lumelsky et al. | |
| 6,473,791 B1 | 10/2002 | Al-Ghosein et al. | |
| 6,631,409 B1 | 10/2003 | Watson et al. | |
| 2003/0037074 A1 * | 2/2003 | Dwork et al. | 707/200 |
| 2004/0111412 A1 * | 6/2004 | Broder | 707/7 |
| 2004/0122855 A1 * | 6/2004 | Ruvolo et al. | 707/104.1 |

OTHER PUBLICATIONS

Solomon et al., Inside Microsoft Windows 2000 Third Edition, Microsoft Press, 2000, pp. 265-275.
Maston, Michael, "Managing Windows with WMI," Microsoft Corporation, http://msdn.microsoft.com/library/techart/mngwmi.htm, Nov. 1999, pp. 1-14.
Snodgrass, Richard, "A Relational Approach to Monitoring Complex Systems," ACM Transactions on Computer Systems, vol. 6, No. 2, May 1988, pp. 157-196.
Joyce et al., "Monitoring Distributed Systems," ACM Transactions on Computer Systems, vol. 5, No. 2, May 1987, pp. 121-150.

(Continued)

*Primary Examiner*—Sathyanarayan Pannala
(74) *Attorney, Agent, or Firm*—Woodcock Washburn LLP (57) ABSTRACT

Methods and systems are described for computing page rankings more efficiently. Using an interconnectivity matrix describing the interconnection of web pages, a new matrix is computed. The new matrix is used to compute the average of values associated with each web page's neighboring web pages. The secondary eigenvector of this new matrix is computed, and indices for web pages are relabeled according to the eigenvector. The data structure storing the interconnectivity information is preferably also physically sorted according to the eigenvector. By reorganizing the matrix used in the web page ranking computations, caching is performed more efficiently, resulting in faster page ranking techniques. Methods for efficiently allocating the distribution of resources are also described.

2 Claims, 9 Drawing Sheets

OTHER PUBLICATIONS

Hollingsworth et al., "Dynamic Control of Performance Monitoring on Large Scale Parallel Systems," Proceedings of the 1993 International Conference on Supercomputing, 1993, pp. 185-194.

Agrawal et al., "OdeView: The Graphical Interface to Ode," Proceedings of the 1990 ACM SIGMOD International Conference on Management of Data, 1990, pp. 34-43.

Shende et al., "Portable Profiling and Tracing for Parallel, Scientific Applications Using C++," Proceedings of the SIGMetrics Symposium on Parallel and Distributed Tools, 1998, pp. 134-145.

Bruegge et al., "A Framework for Dynamic Program Analyzers," Proceedings of the Eighth Annual Conference on Object-oriented Programming Systems, Languages, and Applications, 1993, pp. 65-82.

S. T. Barnard, A. Pothen and H .D. Simon, "A spectral algorithm for envelope reduction of sparse matrices", Numerical Linear Algebra with Applications, 2, pp. 317—334, 1995.

Page, Lawrence; Brin, Sergey; Motwani, Rajeev; Winograd, Terry. "The PageRank Citation Ranking: Bringing Order to the Web", Nov. 1999, http://dbpubs.stanford.edu/pub/1999-66.

Kamvar, S.D. et al., "Extrapolation Methods for Accelerating PageRank Computations", *Proceedings of the 12th International World Wide Web Conference*, 2003, 10 pages, XP-002343504.

Page, L. et al., "The PageRank Citation Ranking: Bringing Order to the Web", *Stanford Digital Libraries Working Paper*, 1998, 1-17, XP-002951571.

Wang, Z. et al., "Improved Link-Based Algorithms for Ranking Web Pages", www.cs.nyu.edu/csweb/research/TechReports, 2003, 10 pages, XP-002343499.

Zack, M.H., "Researching Organiational Systems Using Social Network Analysis", *Proceedings of the Hawaii International Conference on System Sciences*, 2000, 1-7, XP 002205850.

Das, T.K. et al., "NetEffect: A Network Architecture for Large-scale Multi-user Virtual Worlds", *ACM Symposium on Virtual Reality Software and Technology*, 1997, 157-163, XP 002365917.

\* cited by examiner

EFFICIENTLY RANKING WEB PAGES VIA MATRIX INDEX MANIPULATION AND IMPROVED CACHING

FIELD OF THE INVENTION

This invention pertains generally to the field of Internet searching and more particularly ranking web pages via matrix computations.

BACKGROUND OF THE INVENTION

The Internet presently comprises billions of web pages interconnected via hyperlinks. Users of the Internet typically use web browsing applications ("browsers") to navigate among these pages by either selecting and clicking hyperlinks, or by manually entering a "Uniform Resource Locator" ("URL") which allows the browser to access a particular web page directly. Often times, however, a user wishes to search the Internet for pages containing particular items of information. Because of the size of the Internet, it is impractical for a user to manually browse the Internet searching for relevant pages. Instead, users typically invoke search engines, which are computer applications developed for the purpose of searching the Internet. Search engines typically reside on server computing devices and accept queries from client users. A search engine is usually associated with an index of web pages, and, in response to a user query, returns a list of pages satisfying the query.

Some modern search engines rank web pages in order to provide users with more relevant results. Many search engines represent the interconnection of web pages via a matrix, and finding a page ranking equates to finding the principal eigenvector of the matrix. Such a search engine is described by Page et al. in "The PageRank citation ranking: Bringing order to the web," *Stanford Digital Libraries Working Paper*, January 1998, which is hereby incorporated by reference in its entirety for all that it teaches without exclusion of any part thereof. Generally, an iteration takes a ranking of the web pages and propagates it across the interconnection matrix, to obtain an updated ranking for the pages. Eventually, the rankings for all pages converge to fixed values, which are the entries of the principal eigenvector. This is equivalent to calculating the stationary distribution of a Markov chain. Due to the size of the matrices, computing the eigenvector—and thus the page ranks—is a computationally intensive task in existing systems, requiring several iterations of matrix manipulation before values for all pages converge to the eigenvector. In order to compute the page rank more efficiently, researchers have attempted to exploit particular mathematical properties of the interconnection matrix in order to find methods of computing or approximating page rankings more quickly.

Computing page rankings can be a computationally intensive task for several reasons. One reason is simply the magnitude of the amount of information: with billions of web pages, performing the necessary computations can require significant amounts of time, even on fast processors, and even if all the data was immediately available to the processor. Another reason, however, is that generally not all the data is immediately available to the processor, necessitating retrievals of data from a storage area such as RAM, or a secondary storage such as a hard drive. Accessing RAM typically costs about 100 nanoseconds per access; accessing a hard drive typically costs about 5-10 milliseconds per access. This acts as a bottleneck for an otherwise fast processor—a processor capable of performing a billion operations a second is limited to reading the data in at a rate of about 10 million entries per second, or roughly one percent of its capability.

Furthermore, many matrix operations performed by existing page ranking techniques use arbitrary index labels for the web pages. As a result, there is no relationship between the rows (or the columns) of the corresponding interconnectivity matrix. For example, if Page #1 contains links to Pages #226, #4,250,221 and #1,000,000,152, then the corresponding row #1 of an interconnectivity matrix would have entries in columns #226, #4,250,221 and #1,000,000, 152. In order to retrieve those pages, three accesses must be made from three likely very remote areas of memory.

Researchers have also investigated caching systems. Generally, a "cache" is a small area of fast memory that temporarily holds data or instructions retrieved from slower, less expensive memory. By temporarily storing often-used data or instructions in a cache, a processor does not need to retrieve those data or instructions from the slower memory. Effective use of caches thus increases the speed with which many operations are performed on a computing device.

BRIEF SUMMARY OF THE INVENTION

Methods and systems are provided for computing page rankings more efficiently. Using an interconnectivity matrix describing the interconnection of web pages, a new matrix is computed. The new matrix is used to compute the average of values associated with each web page's neighboring web pages. The secondary eigenvector of this new matrix is computed, and indices for web pages are relabeled according to the eigenvector. The data structure storing the interconnectivity information is preferably also physically sorted according to the eigenvector. By reorganizing the matrix used in the web page ranking computations, caching is performed more efficiently, resulting in faster page ranking techniques.

In one aspect, a method of ranking objects in a collection of objects is provided, one or more of the objects in the collection having links to other objects in the collection, the method comprising: ordering the objects according to their proximity to other objects in the collection with respect to the links, and storing the links between objects in a memory according to the ordering of the objects.

In another aspect, a computer-readable medium is provided, including computer-executable instructions facilitating the ranking of objects in a collection of objects, one or more of the objects in the collection having links to other objects in the collection, the computer-executable instructions performing the steps of: ordering the objects according to their proximity to other objects in the collection with respect to the links, and storing the links between objects in a memory according to the ordering of the objects.

In still another aspect, a method of ordering objects from a collection of interconnected objects is provided, the interconnection of objects represented by a first matrix, the method comprising: computing a second matrix relative to the first matrix, approximating a secondary eigenvector of the second matrix, and ordering the objects relative to the values in the approximation to the secondary eigenvector.

In yet another aspect, a computer-readable medium is provided, including computer-executable instructions facilitating the ordering of objects in a collection of interconnected objects, the interconnection of objects represented by a first matrix, the computer-executable instructions performing the steps of: computing a second matrix relative to the first matrix, approximating a secondary eigenvector of the second matrix, and ordering the objects relative to the values in the approximation to the secondary eigenvector.

In still another aspect, a computer-readable medium is provided, including computer-executable instructions facilitating the ranking of objects in a collection of interconnected objects, a description of the interconnection stored in a memory according to a first ordering of the objects, the computer-executable instructions performing the step of re-ordering the objects relative to their proximity to the other objects via the interconnection.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The methods and systems to efficiently compute page rankings will now be described with respect to preferred embodiments; however, the methods and systems of the present invention are not limited to computing page rankings of web pages. Moreover, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
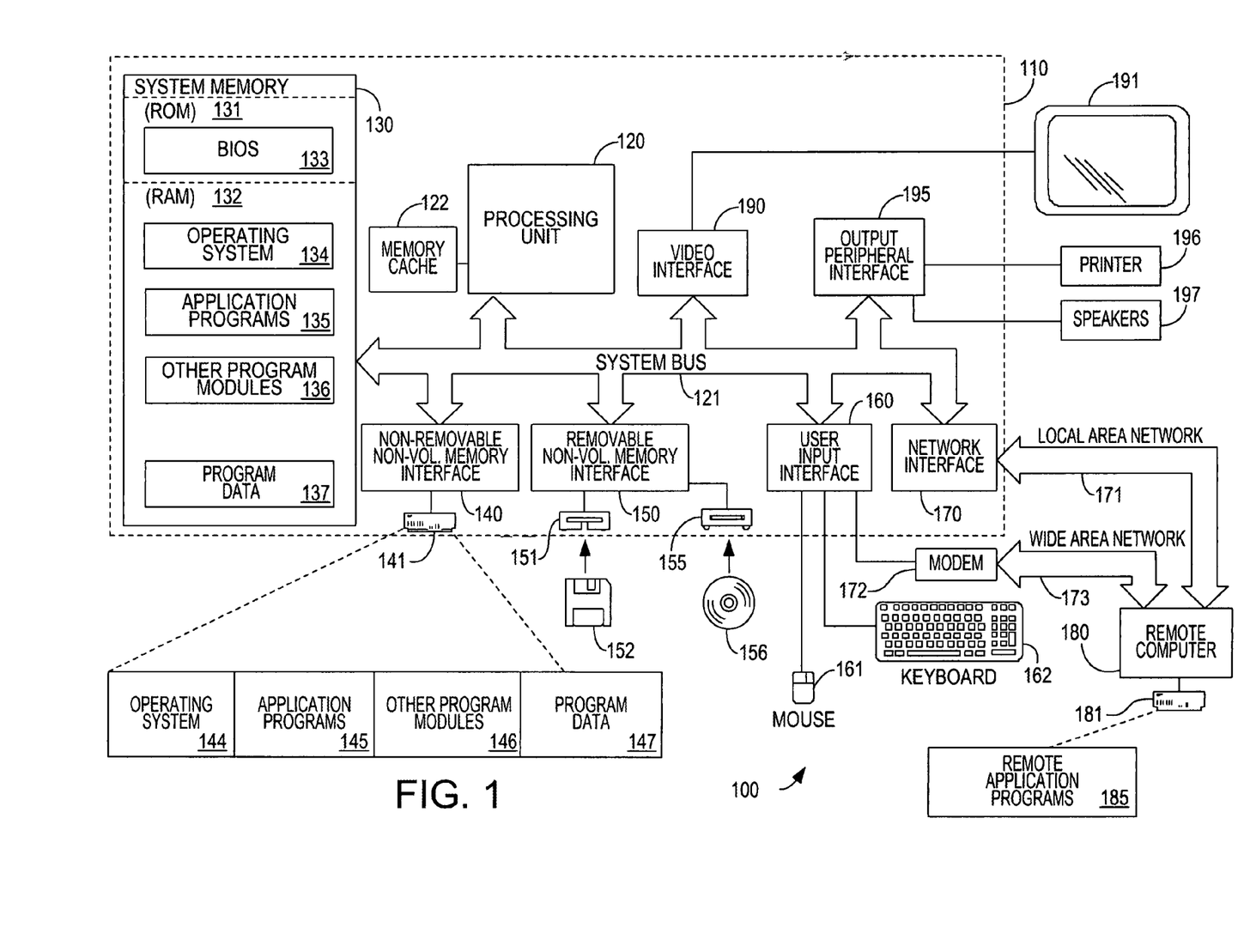
FIG. 1 is a simplified schematic illustrating an exemplary architecture of a computing device for carrying out web page ranking and searching, in accordance with an embodiment of the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Additionally, components of the computer 110 may include a memory cache 122. The processing unit 120 may access data from the memory cache more quickly than from the system memory 130. The memory cache 122 typically stores the data most recently accessed from the system memory 130 or most recently processed by the processing unit 120. The processing unit 120, prior to retrieving data from the system memory 130, may check if that data is currently stored in the memory cache 122. If so, a "cache hit" results and the data is retrieved from the memory cache 122 rather than from the generally slower system memory 130.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
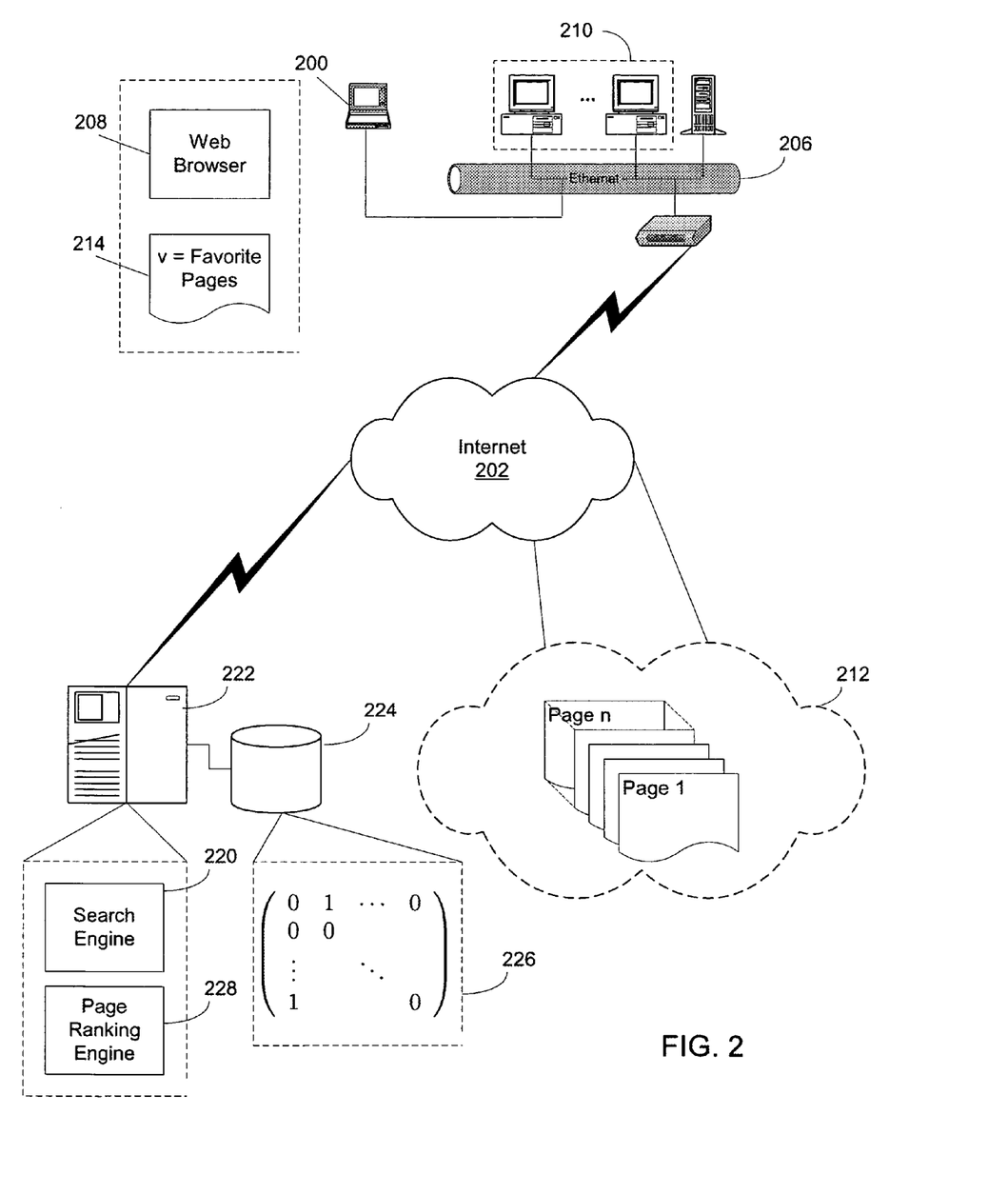
FIG. 2 is a diagram illustrating an arrangement of computing devices connected to the Internet for carrying out web page ranking and searching, in accordance with an embodiment of the invention.

Turning to FIG. 2, a simple example of a computing environment is depicted wherein the invention is potentially exploited. In the illustrative environment, a computer 200 includes a network interface card (not specifically shown) facilitating communications over a communications medium. In the particular example depicted in FIG. 2, the computer 200 communicates with a local area network 206 via physical connection. Alternatively, the computer 200 could communicate with the local area network 206 via WWAN or WLAN media, or via other communications media.

The user of the computer 200, as a result of the supported network medium, is able to access the Internet 202. For example, the computer 200 accesses resources on the LAN 206 directly via physical connection to the LAN 206. The LAN 206 in the illustrative example is assumed to include network access and proxy servers that enable a properly authenticated user of the computer 200 to access resources of the Internet 202.

The Internet 202 is presented to the user of the computer 200 in the form of web pages. A web page contains content and instructions to be processed and displayed by a web browser application 208 residing on the computer 200. Alternatively, the web browser application 208 resides on a networked computer 210, and is graphically displayed on the computer 200 via a remote display program. Web pages also contain hyperlinks to other web pages, allowing a user to easily navigate from a displayed page to related pages by selecting a presented hyperlink. In this way, the hyperlinks on pages create a "web" of interconnected pages, whereby a user can navigate from one page to any of millions or billions of pages by a series of hyperlink selections. Although there may be several billion interconnected web pages accessible over the Internet 202, it is useful for purposes of the present invention to consider the pages as an ordered set of pages 212 numbered 1 to n, where n is the total number of pages accessible on the interconnected network of web pages. To aid users in keeping track of interesting web pages, web browser applications, can contain a "Favorites" or "Bookmarks" feature 214, whereby the user is able to store a list of web pages he is likely to access frequently, enabling easy navigation to those pages in the future.

Although a user is able to navigate to web pages merely by selecting hyperlinks, tools such as search engines exist to aid the user in finding particular information contained in web pages. In a typical scenario, the search engine 220 is housed in a server 222 connected to the Internet 202, and is also connected to a database 224 containing indices and information 226 about web pages on the Internet. In a typical search engine, the user is presented with a web page on which he enters search parameters, usually in the form of search terms. The search engine 220 uses its database 224 to process the user request and in turn present the user with a new web page containing links to other pages that satisfied the parameters of the user's request.

When a large number of pages satisfy the search parameters, presenting the search results to the user in an organized manner may be problematic. A list of thousands of web pages in no particular order forces the user to painstakingly manually sort through the entire list to find relevant pages. Therefore, modern search engines often grade or "rank" pages based on presumed relevance to the user by using, for example, an incorporated page ranking engine 228. The web pages satisfying the search can then be sorted by presumed relevance, so that the user is presented with the most relevant results at the top of the result list.

Determining the relevance of any particular web page, however, is not a trivial task. One approach to determining relevance looks at the structure of interconnectivity amongst pages on the Internet, to discover which pages are "popular" in that many other web pages contain hyperlinks leading to that page. The structure of interconnectivity can be stored on the database connected to the search engine in the form of an "connectivity matrix", where entry [i.j] in the matrix indicates the presence of a hyperlink from page j to page i.

Figure 3:
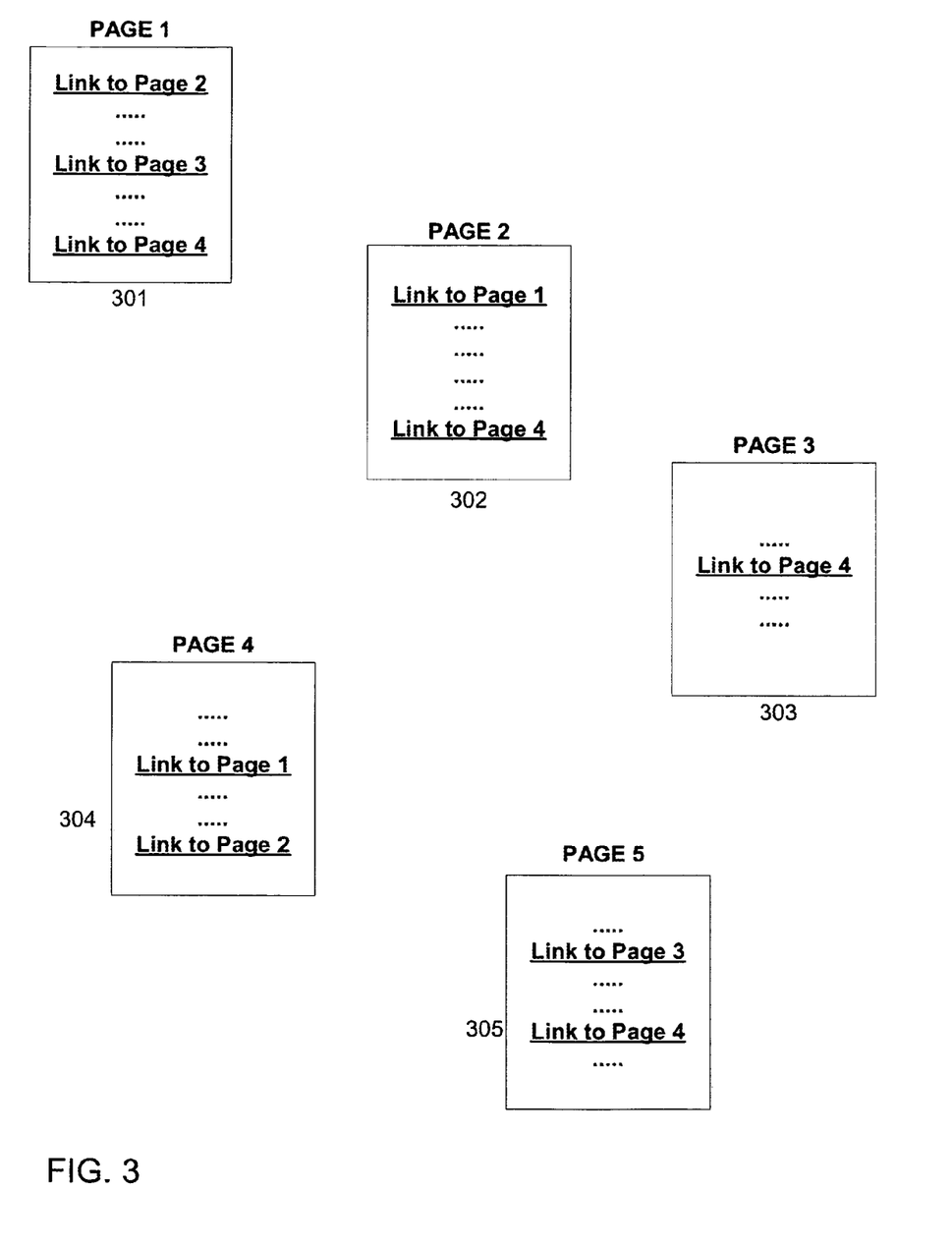
FIG. 3 is an example illustrating a collection of web pages, in accordance with an embodiment of the invention.

An example of a connectivity matrix used to describe the interconnectivity among web pages, as used in an embodiment of the present invention, is now described with reference to FIG. 3. The universe of web pages in the example of FIG. 3 consists of only five web pages, for illustrative purposes. Page1 301 contains hyperlinks to page2 302, page3 303 and page4 304. Page2 302 contains hyperlinks to page1 301 and page4 304. Page3 303 contains only one hyperlink to page4 304. Page4 contains hyperlinks to page1 301 and page2 302. Page5 contains hyperlinks to page3 303 and page4 304. In the example, this interconnectivity is described by the connectivity matrix $$\begin{pmatrix} 0 & 1 & 0 & 1 & 0 \\ 1 & 0 & 0 & 1 & 0 \\ 1 & 0 & 0 & 0 & 1 \\ 1 & 1 & 1 & 0 & 1 \\ 0 & 0 & 0 & 0 & 0 \end{pmatrix}$$

where an element at row i, column j is 1 if an only if there is link from page j to page i. If a hyperlink is chosen uniformly at random from a page, then there is a corresponding probability p(i,j) of going from page j to page i when a hyperlink is chosen. The corresponding random walk transition matrix A is:

$$A = \begin{pmatrix} 0 & 0.5 & 0 & 0.5 & 0 \\ 0.33 & 0 & 0 & 0.5 & 0 \\ 0.33 & 0 & 0 & 0 & 0.5 \\ 0.33 & 0.5 & 1 & 0 & 0.5 \\ 0 & 0 & 0 & 0 & 0 \end{pmatrix}.$$

The sum of each column of matrix A equals 1. The present invention is not limited, however, to choosing a hyperlink uniformly at random within a page. Any arbitrary probability distribution may be applied to the choosing of hyperlinks within any particular page. For example, if statistical data is known about actual usage patterns, that information can be applied in assigning the probabilities contained in A.

Given that the Internet currently comprises billions of pages, and the vast majority of these pages do not contain hyperlinks between them, matrix A as used in practice outside this example will be a sparse matrix containing mostly zero-entries. The sparseness property is useful because it allows for compression techniques to store the matrix efficiently. In addition to sparseness, another important matrix concept is the "rank" of a matrix, a mathematical term unrelated to a web page's "pagerank" or "rank" of an individual web page. The rank of a matrix is the number of linearly independent columns (or rows) of the matrix. For practical purposes, matrices of lower rank can be stored more efficiently than matrices of higher rank—a n×n matrix of rank-k contains information requiring on the order of kn storage, rather than the order of $n^2$ storage potentially required by a matrix of rank-n.

Figure 4A:
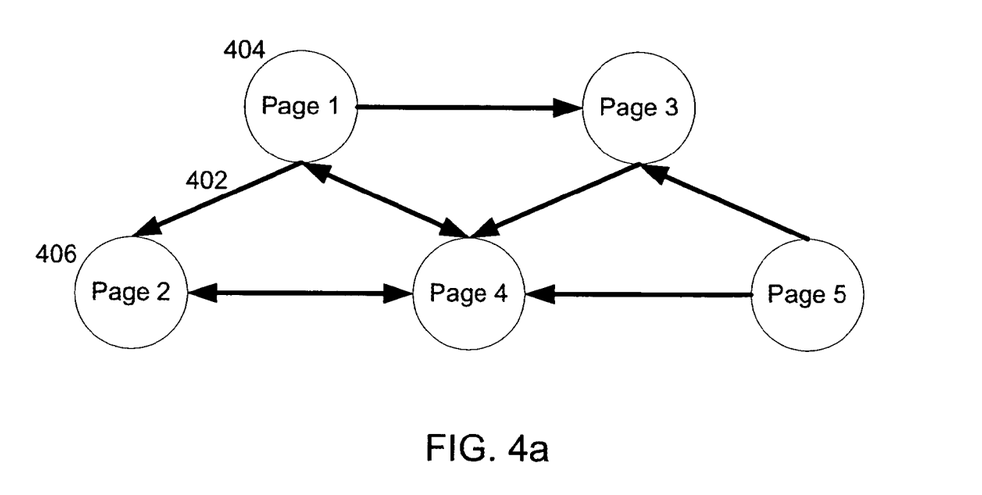
FIGS. 4a and 4b are diagrams illustrating a graph of nodes and edges corresponding to an interconnection of web pages, in accordance with an embodiment of the invention.
Figure 4B:
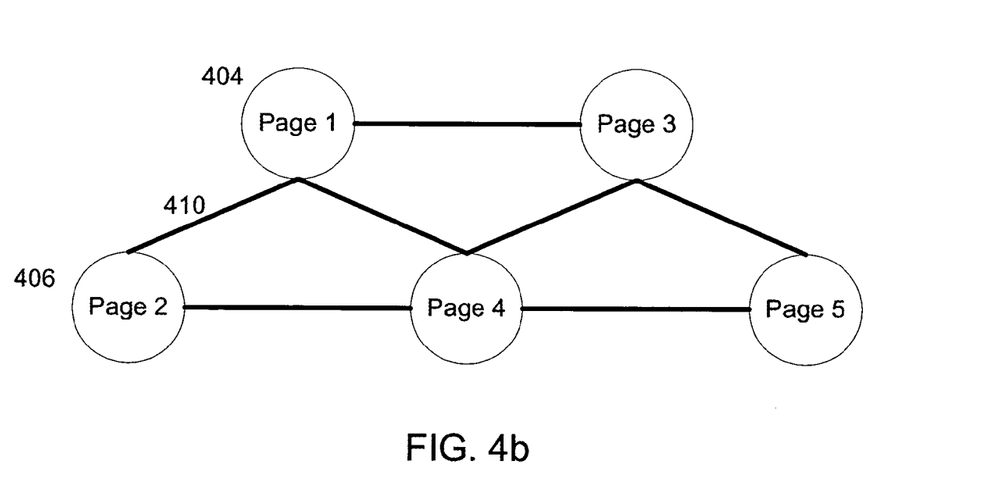

Alternatively, the connectivity among the pages may be considered in the form of a graph containing vertices and directed edges. In this manner, each vertex represents a web page, and each directed edge represents a hyperlink between pages. By assigning weights to the edges, a probability distribution among a page's hyperlinks can be represented. An example of a graph corresponding to the interconnection of web pages shown in FIG. 3 is now described with respect to FIGS. 4a-4b. In FIG. 4a depicts a set of vertices corresponding to web pages and a set of edges connecting the vertices. For example, directed edge 402 corresponds to the link from Page1 404 (corresponding to Page1 301 in FIG. 3) to Page2 406 (i.e., Page2 302 in FIG. 3). The directed graph of FIG. 4a is consistent with the interconnectivity matrix given above. An embodiment of the present invention considers graphs with undirected edges, as shown in FIG. 4b. In an undirected graph, an edge 410 between Page1 404 and Page2 406 corresponds to either a link from Page1 301 to Page2 302, or a link from Page2 302 to Page1 301, or both. The corresponding interconnectivity matrix to an undirected graph is generally a symmetric matrix, such that the entry in column j, row i is equal to the entry in row j, column i. The symmetric matrix corresponding to the graph of FIG. 4b is $$\begin{pmatrix} 0 & 1 & 1 & 1 & 0 \\ 1 & 0 & 0 & 1 & 0 \\ 1 & 0 & 0 & 1 & 1 \\ 1 & 1 & 1 & 0 & 1 \\ 0 & 0 & 1 & 1 & 0 \end{pmatrix}.$$

Figure 5:
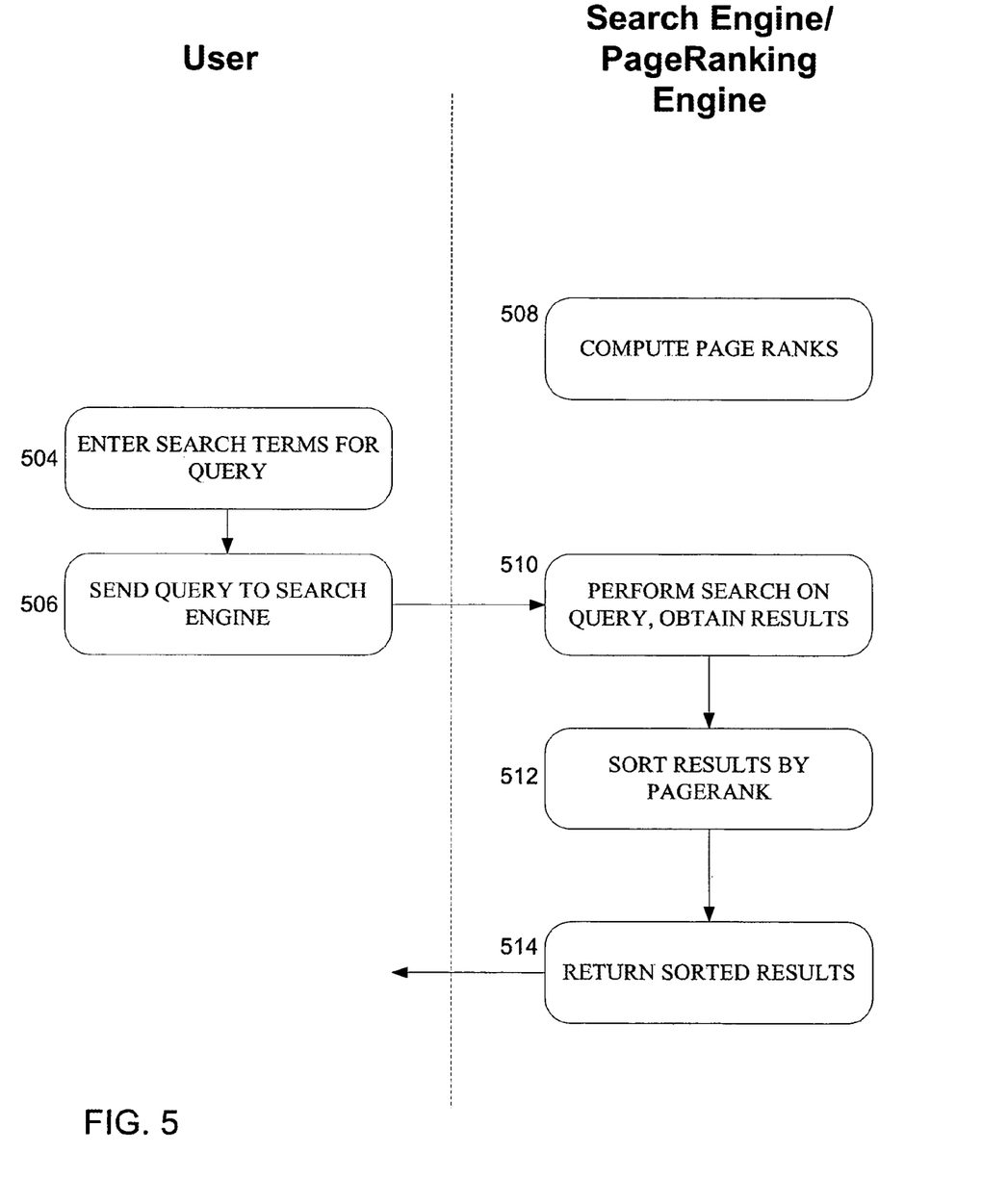
FIG. 5 is a flow diagram illustrating a method of performing a search among a collection of web pages, in accordance with an embodiment of the invention.

Turning to FIG. 5, in accordance with one embodiment, a user enters search terms at step 504 and sends the query to the search engine at step 506. A page ranking engine, prior to receiving the query, has computed page ranks for pages at step 508 based on the interconnectivity (and possibly other statistical data) of web pages on the Internet. After receiving the query, the search engine performs the search on the given search terms and obtains the results at step 510. The search engine then sorts the results by pagerank at step 512. The sorted results are returned to the user at step 514.

Several existing methods for ranking web pages utilize the notion of a theoretical "random walk" among the web pages of the Internet. Generally, a random walk can be thought of as starting at some web page k and then selecting a hyperlink to page j with some probability A[j, k]. The walk continues from page j by selecting a hyperlink to another page i, with some probability A[i, j], or by randomly 'teleporting' to another page to avoid dead-ends. The theoretical random walk continues indefinitely. By performing mathematical manipulations on the random walk transition matrix A, a search engine can rank a page based on the probability or arriving at the page at a step of the random walk. Existing page ranking algorithms compute the page rank of a page by computing the stationary distribution of a Markov chain represented by A or a related transition matrix. This may correspond to finding the principal eigenvector of a transition matrix (i.e., the eigenvector whose corresponding eigenvalue is maximal). Several techniques are known for computing page rankings in this manner.

Figure 6:
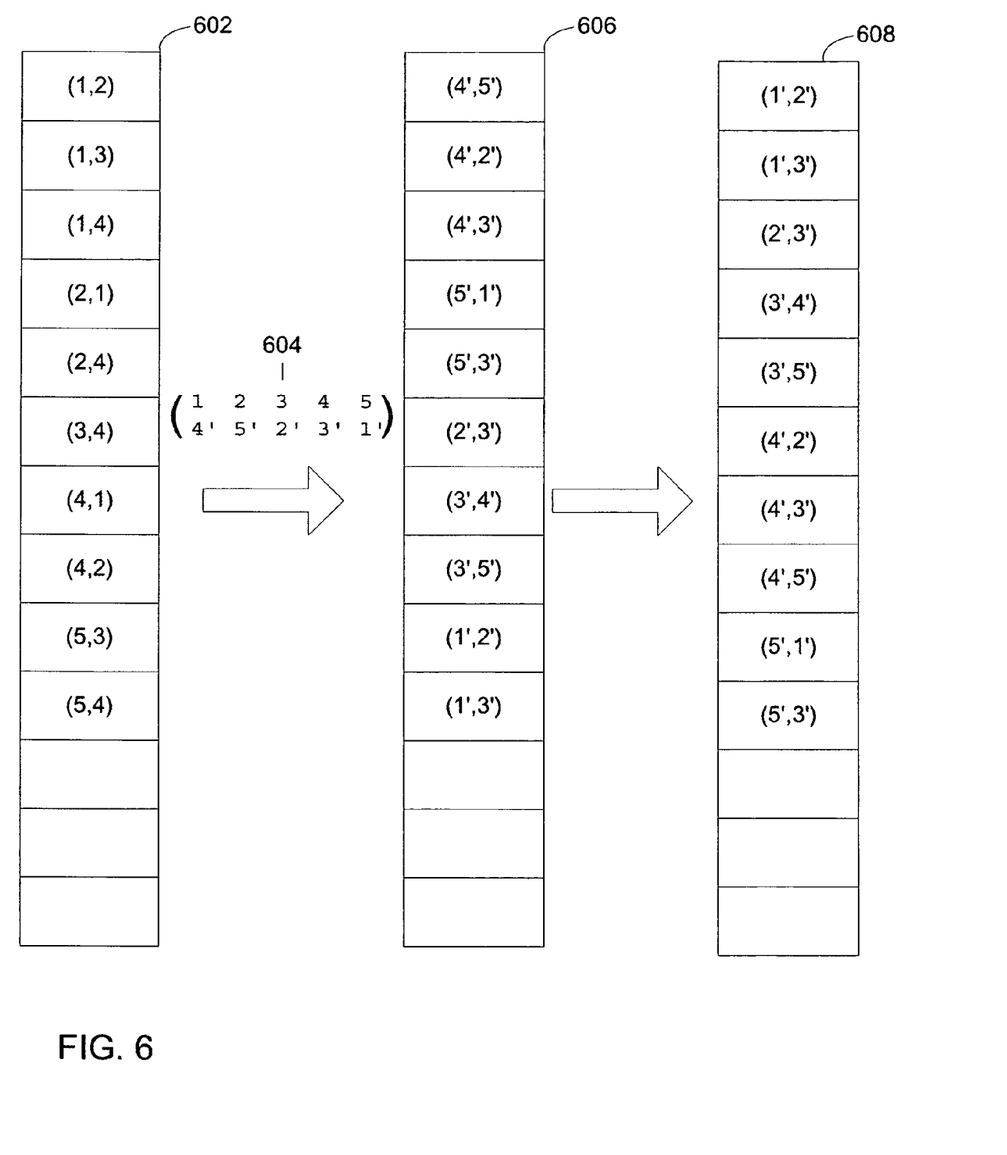
FIG. 6 is a schematic diagram illustrating the relabeling and sorting of an array of web page links, in accordance with an embodiment of the invention.

As is typical with existing page ranking methods, embodiments of the invention store data regarding the interconnection of web pages in a memory with a particular data structure. An exemplary data structure is described with reference to FIG. 6. An array 602 contains one entry for each edge in the corresponding web graph (i.e., for each nonzero element in the connectivity matrix), as shown in FIG. 4a. Each array element is of a uniform size, and the array 602 occupies a contiguous block of memory. By storing information only about the actual edges, and not the non-edges, much less memory is required than if the entire connectivity matrix (i.e., including the zero entries) was stored. An array element contains an edge description (i,j), representing the link from page i to page j. In the example of FIG. 6, the elements in the array 602 are sorted by the first value of the pair, which represents the web page from which the link is outgoing. The index used to sort the exemplary array 602 is arbitrary, and there is no significance to the relative order or labeling of the pages.

Typically, a page ranking method will access data structures such as the example in FIG. 6 sequentially, processing one element after another. Additionally, typical page ranking methods use an additional data structure for maintaining page ranking information corresponding to pages. A typical data structure for maintaining page ranking information is a single-dimensional array, with one array element per page. Such an array of page ranking information is generally accessible via random access, by retrieving the element for a particularly specified index.

As previously mentioned, one contributing factor to the amount of time necessary to perform page ranking is the number of memory accesses required by the processor. Each access to memory adds an amount of time (about 100 nanoseconds) that is very large relative to the processor's speed. A processor cache, however, requires significantly less time to be accessed. Embodiments of the invention use caches and either or both of two related but independent techniques to reduce the number of accesses required of memory. First, nodes (web pages) are relabeled in accordance with an optimized ordering. Although the edges may not be physically rearranged in memory, changing the identifiers of the pages' associated nodes changes the pattern of access to an array of page ranking information. For example, if the nodes corresponding to two pages that are frequently both linked-to by other pages are relabeled to have adjacent indices, then many accesses to the page ranking information array element for the second page will be preceded by an access to the element for the first page. Because caches store chunks of contiguous memory (and store recently accessed data), an access for the first page may bring the ranking data associated with both pages into the cache. Without relabelling, the access to the two pages are to distinct regions of memory and may occur at very different times, so the cache may not be able to service the second access more efficiently. By relabeling the nodes, it becomes more likely that page ranking data corresponding to adjacent nodes are in the cache at the same time, reducing the likelihood of having to retrieve that data from memory. This advantage is particularly seen when performing indexed accesses to the data structure storing the page ranking information.

In the second technique, page link data is sorted in an optimized order for the particular web graph represented. That is, if a first block of memory contains array elements corresponding to outgoing edges from a first node (web page), then a contiguous second block of elements in the array corresponds to outgoing edges from a second node, and the first and second nodes are "near" each other in the web graph. Arranging the array elements by the proximity of nodes in this manner increases the efficiency of reading links sequentially from a data structure such as that shown in FIG. 6; when reading through the data structure and encountering outgoing edges for a page j, the likelihood is increased that information for page j has already been processed with respect to some edge (i,j) for an earlier page i. This consequently increases the likelihood that page ranking information for page j is presently stored in a cache, resulting in a speed increase in page rank computation. Furthermore, this technique increases the likelihood that, when following a link from one page to another in an exploration of the links (i.e., traversing the array of edge information non-sequentially), the next page's links are not too far away in memory. This provides an advantage, since if a large chunk of contiguous memory containing edge information is read at once into a cache, it is less likely that a second chunk will need to be read soon thereafter. Generally, the nodes are also relabeled, as in the first technique described above, and those advantages are additionally obtained.

Results of applying the two techniques described above are illustrated in FIG. 6. In the example, a relabeling of the web pages is performed by permuting the labels according to the permutation $$\begin{pmatrix} 1 & 2 & 3 & 4 & 5 \\ 4' & 5' & 2' & 3' & 1' \end{pmatrix} 604,$$

so that Page1 is relabeled as Page4', Page2 is relabeled as Page5', etc. Array 606 illustrates the array with relabeled elements. In one embodiment, elements of the array are not themselves relabeled, however. Instead, the relabeling is performed external to the array elements; the edges represented by the relabeled array 606 are not sorted, so consequently, there may not be any physical change to the contents of array 602. This corresponds to the first technique described above. Continuing with the example, the second technique described above is applied to sort the array elements according to their relabeling. This results in a rearranging of array elements to yield the exemplary array 608. The elements of array 608 are physically sorted according to the relabeling, although the actual content of an array element is not relabeled. Thus, element 610 of resorted array 608 actually contains a value "(1,4)", rather than a relabeled value "(2', 3')"—a page ranking method making use of resorted array 608 preferably performs on-the-fly relabeling of the edges, using the relabeled indices to access an array of page ranking information for the pages.

Figure 7:
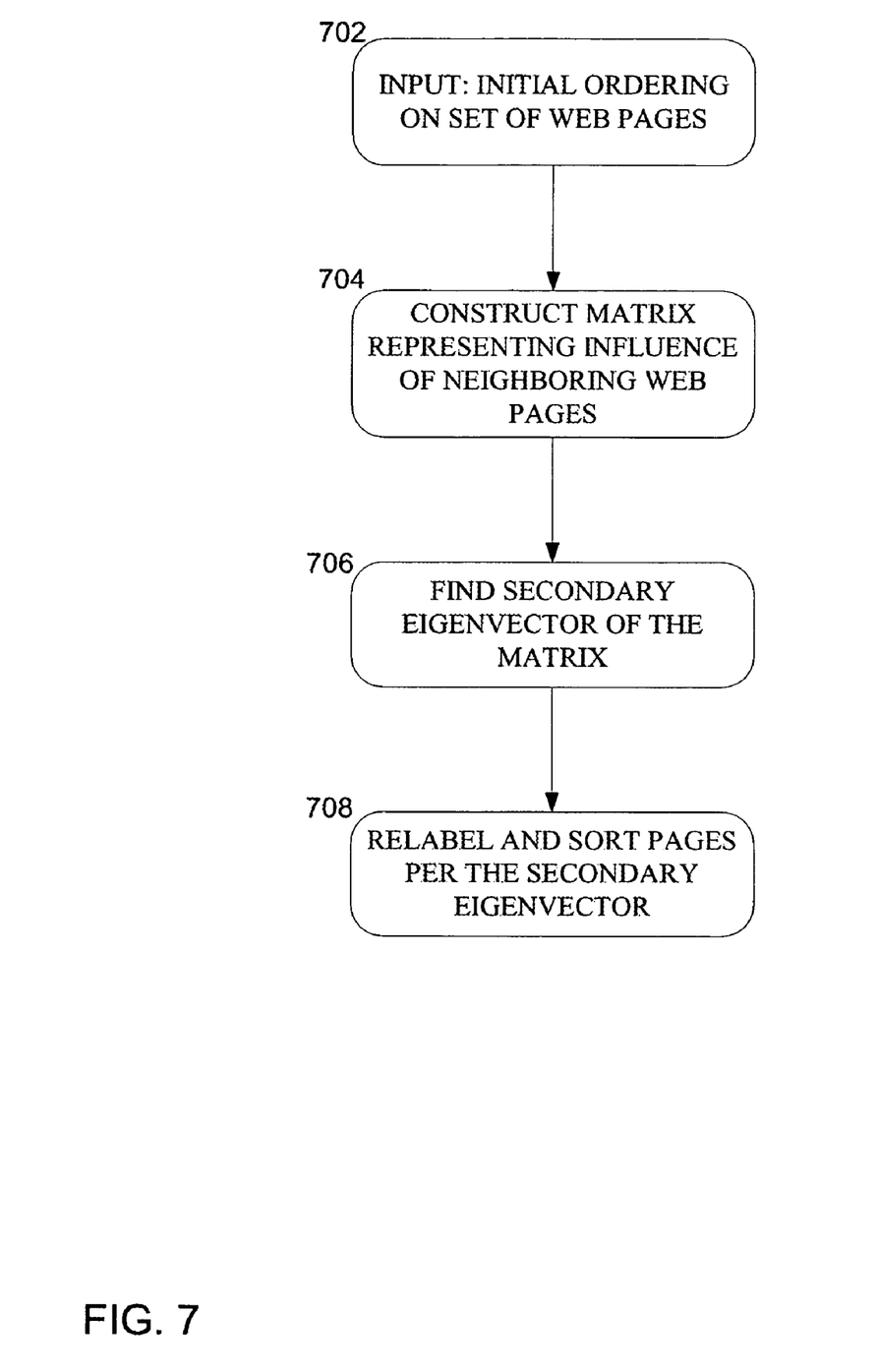
FIG. 7 is a flow diagram illustrating a general method for computing a re-ordering of web pages, in accordance with an embodiment of the invention.
Figure 8:
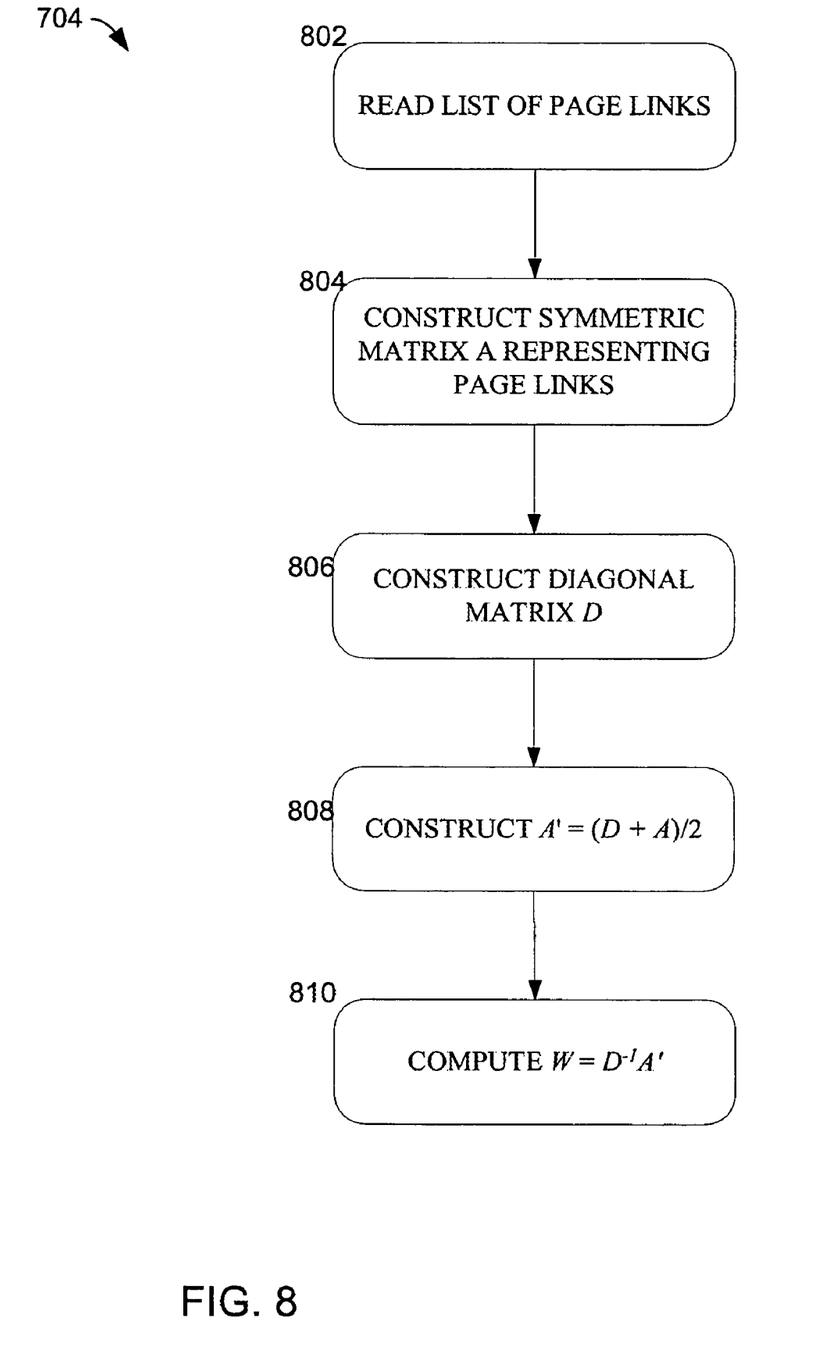
FIG. 8 is a flow diagram illustrating a method for computing a matrix representing the influence of neighboring web pages, in accordance with an embodiment of the invention.
Figure 9:
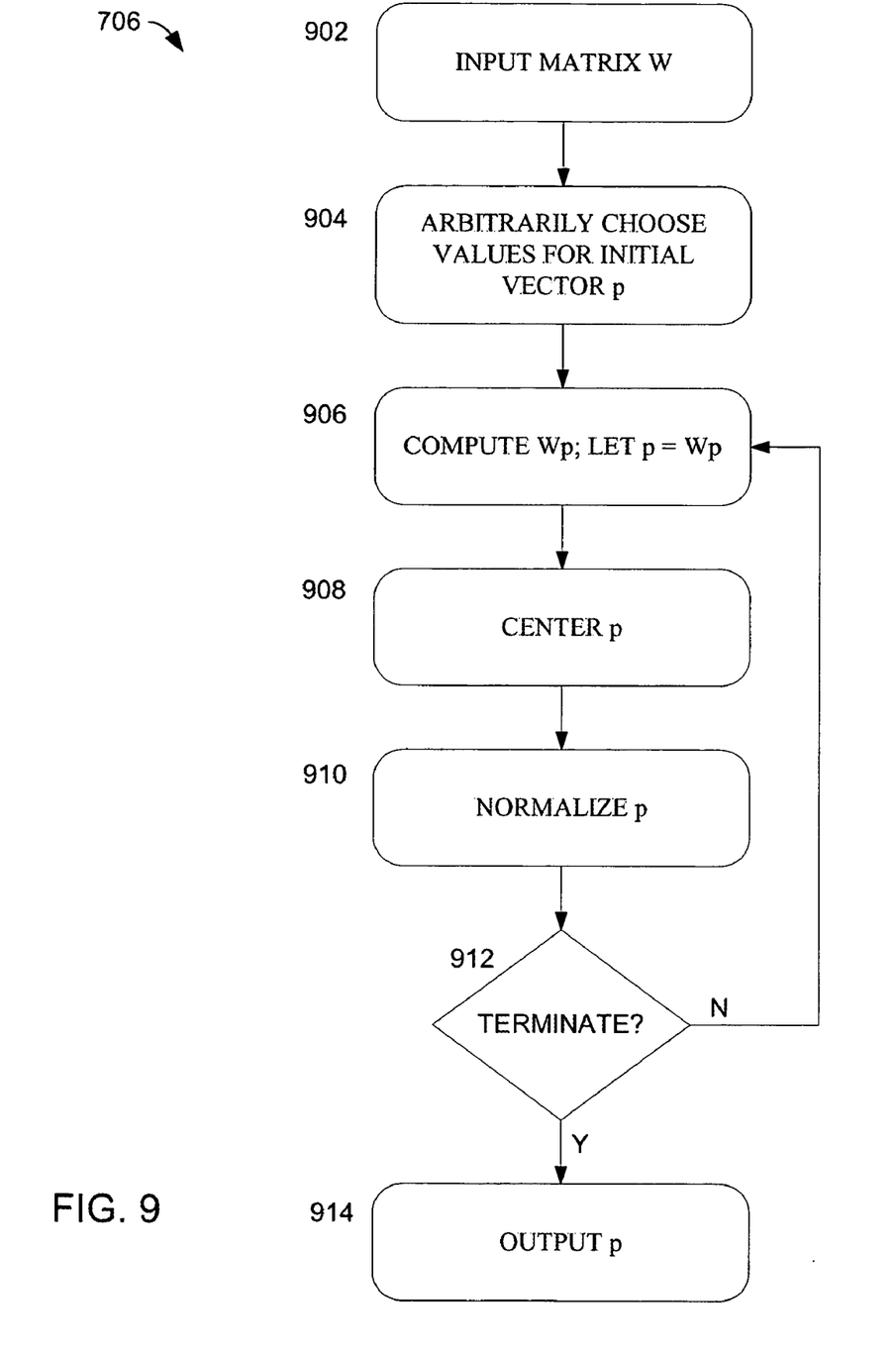
FIG. 9 is a flow diagram illustrating a method of computing a secondary eigenvector, in accordance with an embodiment of the invention.

Turning to FIGS. 7-9, a method is described for computing a re-ordering of web pages to increase the speed with which page rankings are calculated, as used in an embodiment of the invention. Generally, the method takes an initial ordering for a set of web pages at step 702, constructs a matrix representing the weighted influence that pages have on their neighbors at step 704, and finds the secondary eigenvector of this matrix (i.e., the eigenvector whose corresponding eigenvalue is the second greatest) at step 706. The web pages are relabeled and sorted at step 708 according to the values in the eigenvector.

In more detail, FIG. 8 shows a method of constructing a matrix representing the weighted influence that pages have on their neighbors, as used in an embodiment of the invention. The method begins by reading a list of links between pages at step 802. A first symmetric matrix is constructed representing the links between the pages at step 804. Alternatively, a symmetric matrix is not constructed, and the method considers only incoming, or only outgoing links from pages. A diagonal matrix D is then constructed at step 806, where a diagonal entry D[i, i] is set to the number of links entering or leaving the corresponding page i. For the exemplary set of web pages in FIGS. 3 and 4, the diagonal matrix is:

$$\begin{pmatrix} 3 & 0 & 0 & 0 & 0 \\ 0 & 2 & 0 & 0 & 0 \\ 0 & 0 & 3 & 0 & 0 \\ 0 & 0 & 0 & 4 & 0 \\ 0 & 0 & 0 & 0 & 2 \end{pmatrix}.$$

A new matrix is constructed at step 808 by averaging the elements of the first matrix and the diagonal matrix D. Embodiments of the invention perform this step 808 to ensure that various degenerate conditions do not arise later when computing the secondary eigenvector. The method continues at step 810 by multiplying the inverse of diagonal matrix D by the new matrix in order to compute a matrix W representing the weighted pull of page neighbors. In the example of FIGS. 3 and 4, matrix W is:

$$W = \begin{pmatrix} 0.33 & 0 & 0 & 0 & 0 \\ 0 & 0.5 & 0 & 0 & 0 \\ 0 & 0 & 0.33 & 0 & 0 \\ 0 & 0 & 0 & 0.25 & 0 \\ 0 & 0 & 0 & 0 & 0.5 \end{pmatrix} \times \begin{pmatrix} 1.5 & 0.5 & 0.5 & 0.5 & 0 \\ 0.5 & 1 & 0 & 0.5 & 0 \\ 0.5 & 0 & 1.5 & 0.5 & 0.5 \\ 0.5 & 0.5 & 0.5 & 2 & 0.5 \\ 0 & 0 & 0.5 & 0.5 & 1 \end{pmatrix} =$$

$$\begin{pmatrix} 0.5 & 0.167 & 0.167 & 0.167 & 0 \\ 0.25 & 0.5 & 0 & 0.25 & 0 \\ 0.167 & 0 & 0.5 & 0.167 & 0.167 \\ 0.125 & 0.125 & 0.125 & 0.5 & 0.125 \\ 0 & 0 & 0.25 & 0.25 & 0.5 \end{pmatrix}.$$

Turning to FIG. 9, a method of computing a reordering for web pages is described in terms of computing a secondary eigenvector of a matrix, as used in an embodiment of the invention. The method takes as input a matrix W representing the weighted influence of neighboring web pages, such as that computed with the method of FIG. 8, at step 902. Values are initially arbitrary chosen and assigned to each web page to form an initial vector at step 904. An example initial vector is $$\begin{pmatrix} 4 \\ 1 \\ 7 \\ 99 \\ 2 \end{pmatrix}.$$

The vector is multiplied by W at step 906 to yield a new vector representing the approximate average of the values of a page's neighbors:

$$W \begin{pmatrix} 4 \\ 1 \\ 7 \\ 99 \\ 2 \end{pmatrix} = \begin{pmatrix} 19.83 \\ 26.25 \\ 21 \\ 51.25 \\ 27.5 \end{pmatrix}.$$

The new vector is centered at step 908 by adding a sufficient fixed amount to each value in the new vector in order that the average of the values is zero:

$$\begin{pmatrix} 19.83 \\ 26.25 \\ 21 \\ 51.25 \\ 27.5 \end{pmatrix} + \begin{pmatrix} -29.17 \\ -29.17 \\ -29.17 \\ -29.17 \\ -29.17 \end{pmatrix} = \begin{pmatrix} -9.33 \\ -2.92 \\ -8.17 \\ 22.08 \\ -1.67 \end{pmatrix}.$$

The vector is then normalized at step 910 to keep the magnitude of the new vector constant:

$$\text{normalize} \begin{pmatrix} -9.33 \\ -2.92 \\ -8.17 \\ 22.08 \\ -1.67 \end{pmatrix} = \begin{pmatrix} -0.37 \\ -0.11 \\ -0.32 \\ 0.86 \\ -0.07 \end{pmatrix}.$$

At step 912, a termination condition is checked. In one embodiment of the invention, the termination condition is whether values in the new vector differ significantly from values in the previous iteration's vector. In another embodiment, the termination condition is whether a certain number of iterations have been performed. In another embodiment, the termination condition is whether the inner product between vectors from one iteration to the next is close to 1. In still another embodiment, the termination condition is whether the relative ordering of the values of the vector has not changed for some number of iterations. If the termination condition is satisfied, the method ends, outputting the vector as the secondary eigenvector at step 914. Otherwise, another iteration takes place by returning to step 906 for multiplication of the new vector by W. In the above example, the vector settles to $$\begin{pmatrix} -0.34 \\ -0.62 \\ 0.34 \\ 0.00 \\ 0.62 \end{pmatrix}$$

after about twenty iterations. This vector is approximately the secondary eigenvector of the matrix W given above.

Once the secondary eigenvector has been computed by methods such as those described above, web pages are relabeled and/or sorted in physical memory according to the eigenvector. In the example above, the fifth value of the secondary eigenvector is largest, so Page5 is relabeled as Page1', and the indices of the connectivity matrix are relabeled accordingly. Similarly, Page3 is relabeled as Page2', Page4 is relabeled as Page3', etc., following the ordering of the values in the secondary eigenvector. A page ranking technique is then used to rank the web pages, using the new labels for the pages. Matrices with such relabeled pages effectively shift rows of the original matrix and columns of the original matrix, so that rows near each other and columns near each other represent web pages that are near each other in the web graph. Since many page ranking techniques perform matrix operations by progressing through the rows and/or columns of a matrix in labeled order, the relabeling performed by embodiments of the invention results in increased efficiency of the page ranking techniques. The methods described above for relabeling and sorting the indices of web pages can thus be performed as a pre-processing step, applicable to any number of page ranking techniques.

The application of the present invention is not confined to ranking web pages. The invention is equally applicable to any set of interconnected objects where a matrix is used to represent the interconnections. For example, the invention could be applied in ranking individuals within a social network, or in identifying important resources on an electrical grid or telecommunications network.

Additionally, the invention could be applied to finding an efficient distribution of resources across a distributed network. One particular example of such a distribution of resources is a virtual messaging service comprising many users. A user typically logs on to one of the distributed servers hosting the service and is notified of which of his previously set list of associated users ("friends" or "buddies") is currently also logged into the service. Other users who have included him in their lists are similarly notified of his logging in. The users may then engage in direct communication sessions between each other. In such a system, it would be beneficial if users who are on each other's lists were served by the same one of the distributed servers, thus reducing communication costs between servers on the distributed network. Applying the invention to such a system would thus reduce overall communications costs of the system by helping ensure that users who communicate with each other are generally served by the same server, or by one that is nearby.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A computer-implemented method of ordering objects from a collection of interconnected objects, the interconnection of objects represented by a first matrix, the method comprising:
   computing a second matrix relative to the first matrix;
   approximating a secondary eigenvector of the second matrix by selecting initial values for a first vector, and repeating the steps of:
      multiplying the second matrix by the first vector to obtain a second vector;
      centering the second vector, wherein centering the second vector comprises adding a fixed amount to each entry in the second vector till the average of the second vector's entries is zero; and
      replacing the values of the first vector by the values of the second vector;
   until a termination condition is satisfied;

ordering the objects relative to the values in the approximation to the secondary eigenvector; and storing the objects according to the ordering relative to the values in file approximation to the secondary eigenvector.

2. A computer-readable storage medium including computer-executable instructions facilitating the ordering of objects in a collection of interconnected objects, the interconnection of objects represented by a first matrix, the computer-executable instructions performing the steps of:

computing a second matrix relative to the first matrix;

approximating a secondary eigenvector of the second matrix by performing the steps of:

selecting initial values for a first vector, and repeating the steps of:

multiplying the second matrix by the first vector to obtain a second vector;

centering the second vector, wherein centering the second vector comprises adding a fixed amount to each entry in the second vector till the average of the second vector's entries is zero; and replacing the values of the first vector by the values of the second vector;

until a termination condition is satisfied;

ordering the objects relative to the values in the approximation to the secondary eigenvector; and storing the objects according to the ordering relative to the values in the approximation to the secondary eigenvector.

\* \* \* \* \*